2,900,369
Patented Aug. 18, 1959

2,900,369
POLYIMIDE COMPOSITION

Walter Murray Edwards and Ivan Maxwell Robinson, Wilmington, Del., assignors to E. I. du Pont de Nemours and Company, Wilmington, Del., a corporation of Delaware No Drawing. Application October 11, 1955
Serial No. 539,942

3 Claims. (Cl. 260—78)

This invention relates to a novel polymeric material, namely poly-para-phenylene-bis(1,1-dimethyl pentamethylene)pyromellitimide.

Certain polypyromellitimides have been known heretofore, as disclosed in the Edwards and Robinson patent, U.S. 2,710,853, which issued on June 14, 1955.

The present invention is directed to a polypyromellitimide of the formula

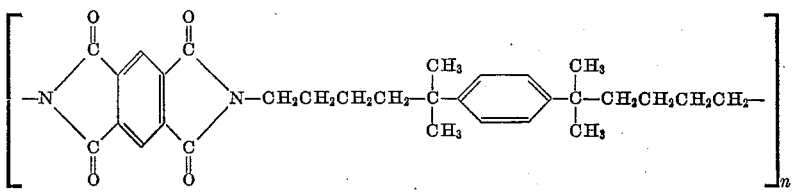

$n$ being the number of these units in the polymeric chain. This polymer is hereinafter referred to by the letters PDAPI.

It has been discovered in accordance with this invention that PDAPI has an excellent combination of properties, especially from the standpoint of toughness and stiffness, which make it highly useful as a thermoplastic resin. Certain of these properties are set forth in the following table.

TABLE I.—PROPERTIES OF PDAPI [1]

| | |
|---|---|
| Inherent viscosity (½% in m-cresol) | 1.5–1.8. |
| Color | Pale yellow. |
| Stick temperature | 260° C. |
| Compression molding temperature | 310° C. |
| Tensile strength: | |
|    Yield stress | 9390 p.s.i. |
|    Ultimate strength | 6739 p.s.i. |
| Elongation | 70%. |
| Flexural modulus (75 mil. compression molded film): | |
|    23° C. | 606,000 p.s.i. |
|    75° C. | 536,000 p.s.i. |
|    100° C. | 482,000 p.s.i. |
|    125° C. | 134,000 p.s.i. |
|    150° C. | Ca. 60,000 p.s.i. |
| Dielectric constant (23° C., 1000 cps.) | 2.67. |
| Dissipation factor (23° C., 1000 cps.) | 0.0025. |

[1] Poly-para-phenylene-bis-(1,1-dimethyl pentamethylene) pyromellitimide.

In addition to the properties tabulated above, it has been found by the present applicant that the crystallinity of PDAPI is of a low order but is increased to a high order on annealing for 2 hours. Films of the highly crystalline PDAPI are tough and creasable. Exposure of PDAPI film to the action of an accelerated weatherometer caused the development of a dark yellow color, and an embrittling of the film, which indicates that this polymer, when exposed to weather conditions, should preferably contain a material such as carbon black which suppresses attack by ultra-violet light.

The method for preparation of the polymer, and intermediates therefor, is set forth below.

*Preparation of para-phenylene-bis-(1,1-dimethyl-4-cyanobutane)*

To 20 grams (0.26 mole) of benzene in about 75 grams of anhydrous hydrogen fluoride at 0–10° C., there was added dropwise 58 grams (0.54 mole) of 5-methyl-5-hexene nitrile. The mixture was stirred at 19° C. (boiling point of hydrogen fluoride) for four to six hours, then poured over one liter of ice and one-half liter of concentrated ammonium hydroxide. The oiler layer was taken into ether and evaporated to dryness on a steam bath. After dissolving in 100 ml. of ethanol, the mixture was cooled overnight whereupon there precipitated 30 grams (50%) of the desired dinitrile (namely para-phenylene-bis-(1,1-dimethyl-4-cyanobutane)), a pale yellow solid, melting point 83–84° C.

*Analysis.*—Calc., for $C_{20}H_{28}N_2$: N, 9.5%. Found: N, 9.7%.

The 5-methyl-5-hexene nitrile was obtained as described in the abandoned United States patent application Serial No. 101,905, filed by Albisetti and Fisher on June 28, 1949; this method consists in heating isobutylene with acrylonitrile at 215°–330° C., under 25–1020 atmospheres pressure.

*Preparation of para-phenylene-bis-1,1-dimethyl-5-aminopentane*

The reduction of 25 grams of the dinitrile in 50 grams of anhydrous ammonia was effected by heating at 130° C. under 4500 p.s.i. of hydrogen with 8 grams of reduced sintered cobalt oxide catalyst for 2 hours. Upon distillation, there was obtained 22 grams (85%) of diamine, boiling point 145–148°/1 mm.; neutralization equivalent: calc. for $C_{20}H_{36}N_2$, 152; found, 151.

*Preparation of polymer (PDAPI)*

A weighed amount of pyromellitic anhydride was dissolved in ten to fifteen parts of ethanol and added to an equivalent amount of the diamine under nitrogen. The ionic salt, after crystallizing overnight, was filtered and air dried. It was packed into a conventional polymer tube and was polymerized without flux by heating under nitrogen at 197° C. (glycol bath) for two and one-half hours. It was pressed at 310° C. into a tough, cold drawable PDAPI film, inherent viscosity (½% in m-cresol), 1.5 to 1.8. This product could also be cold drawn in the form of a melt-spun filament.

It is, of course, to be understood that the specific illustrations hereinabove set forth should not be regarded as necessarily limiting the invention. Thus, the physical properties of the product may vary somewhat from the properties of the particular specimens described above. In particular embodiments, the inherent viscosity may be considerably below or above the 1.5–1.8 level, which, however, is about optimum for various practical applications.

The polymers obtained as described herein are useful in various practical applications, including sheeting, molded products, and the like.

What is claimed is the following:

1. Poly-para-phenylene-bis-(1,1-dimethyl-5-pentamethylene) pyromellitimide characterized in that it can be cold-drawn when in the form of a melt-spun filament.

2. Composition of claim 1 in the form of a film.
3. Composition of claim 1 in the form of a filament.

References Cited in the file of this patent

UNITED STATES PATENTS

| | | |
|---|---|---|
| 2,130,523 | Carothers | Sept. 20, 1938 |
| 2,464,693 | Kirk et al. | Mar. 15, 1949 |
| 2,710,853 | Edwards et al. | June 14, 1955 |